(12) United States Patent
Akimoto

(10) Patent No.: US 11,328,643 B2
(45) Date of Patent: May 10, 2022

(54) DISPLAY UNIT

(71) Applicant: SONY SEMICONDUCTOR SOLUTIONS CORPORATION, Kanagawa (JP)

(72) Inventor: Osamu Akimoto, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/052,613

(22) PCT Filed: May 14, 2019

(86) PCT No.: PCT/JP2019/019075
§ 371 (c)(1),
(2) Date: Nov. 3, 2020

(87) PCT Pub. No.: WO2019/221105
PCT Pub. Date: Nov. 21, 2019

(65) Prior Publication Data
US 2021/0241667 A1 Aug. 5, 2021

(30) Foreign Application Priority Data

May 15, 2018 (JP) .............................. JP2018-093716

(51) Int. Cl.
*G09G 3/20* (2006.01)
*G02B 27/00* (2006.01)
*G02B 27/01* (2006.01)

(52) U.S. Cl.
CPC ........... *G09G 3/20* (2013.01); *G02B 27/0068* (2013.01); *G02B 27/0101* (2013.01);
(Continued)

(58) Field of Classification Search
CPC .. G09G 3/20; G09G 5/00; G09G 5/36; G09G 2340/0407; G09G 2300/023;
(Continued)

(56) References Cited

U.S. PATENT DOCUMENTS 5,726,670 A * 3/1998 Tabata ................. G02B 27/017
345/7
6,445,365 B1 10/2002 Taniguchi et al.
(Continued)

FOREIGN PATENT DOCUMENTS

JP 02-291787 A 12/1990
JP 06-038219 A 2/1994
(Continued)

OTHER PUBLICATIONS

International Search Report and Written Opinion of PCT Application No. PCT/JP2019/019075, dated Aug. 13, 2019, 09 pages of ISRWO.

*Primary Examiner* — Brent D Castiaux
(74) *Attorney, Agent, or Firm* — Chip Law Group

(57) ABSTRACT

A display unit of the present disclosure includes one or more display devices that perform image display by making a difference in resolution for each of a plurality of image regions in an original image, and an optical device that corrects optically for distortion of a display image that is caused by performing the image display at the different resolution for each of the plurality of image regions, a position of the image display between the plurality of image regions, or both.

12 Claims, 13 Drawing Sheets

(52) U.S. Cl.
CPC .. *G02B 27/0179* (2013.01); *G02B 2027/0138* (2013.01); *G02B 2027/0147* (2013.01); *G02B 2027/0187* (2013.01); *G09G 2340/0407* (2013.01)

(58) Field of Classification Search
CPC ............ G09G 2354/00; G02B 27/0068; G02B 27/0101; G02B 27/0179; G02B 27/02; G02B 2027/0138; G02B 2027/0147; G02B 2027/0187; G02B 27/0172; G02B 27/0093; G02B 2027/011; H04N 5/64; G02F 1/01
See application file for complete search history.

(56) References Cited

U.S. PATENT DOCUMENTS

| | | | |
|---|---|---|---|
| 2009/0160872 A1 | 6/2009 | Gibbons | |
| 2016/0261905 A1 | 9/2016 | Aruga et al. | |
| 2017/0132757 A1* | 5/2017 | Th ..................... | G06K 9/00604 |
| 2017/0262054 A1* | 9/2017 | Lanman ............. | G02B 27/0068 |

FOREIGN PATENT DOCUMENTS

| | | | |
|---|---|---|---|
| JP | 07-077665 A | 3/1995 | |
| JP | 07-104210 A | 4/1995 | |
| JP | 2001-281594 A | 10/2001 | |
| JP | 2009-211049 A | 9/2009 | |
| JP | 2015-126304 A | 7/2015 | |
| JP | 2017-522591 A | 8/2017 | |
| JP | 2018-093716 A | 6/2018 | |
| WO | 2015/193287 A1 | 12/2015 | |

* cited by examiner

[FIG. 1]
COMPARATIVE EXAMPLE
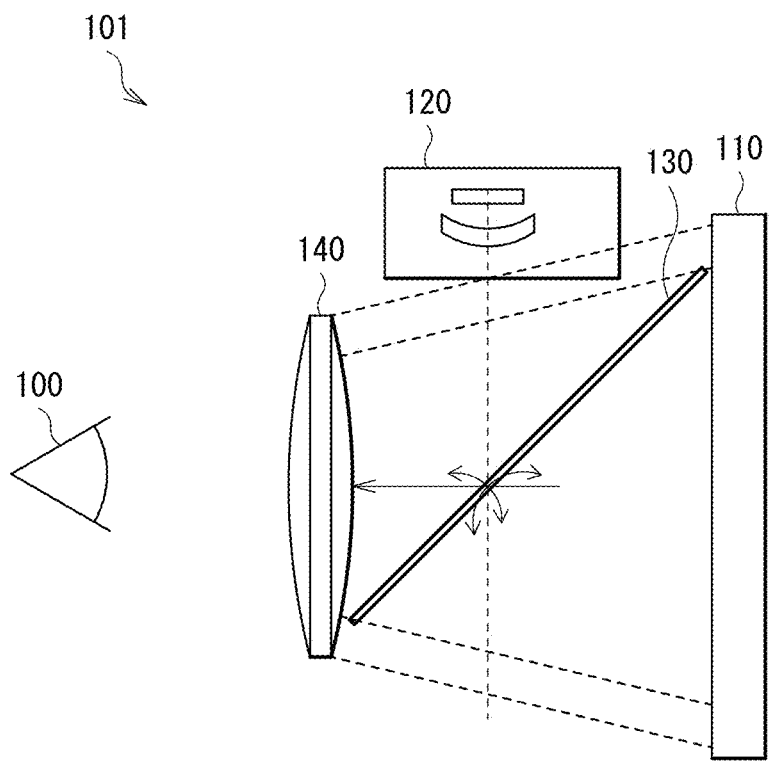

[FIG. 2]
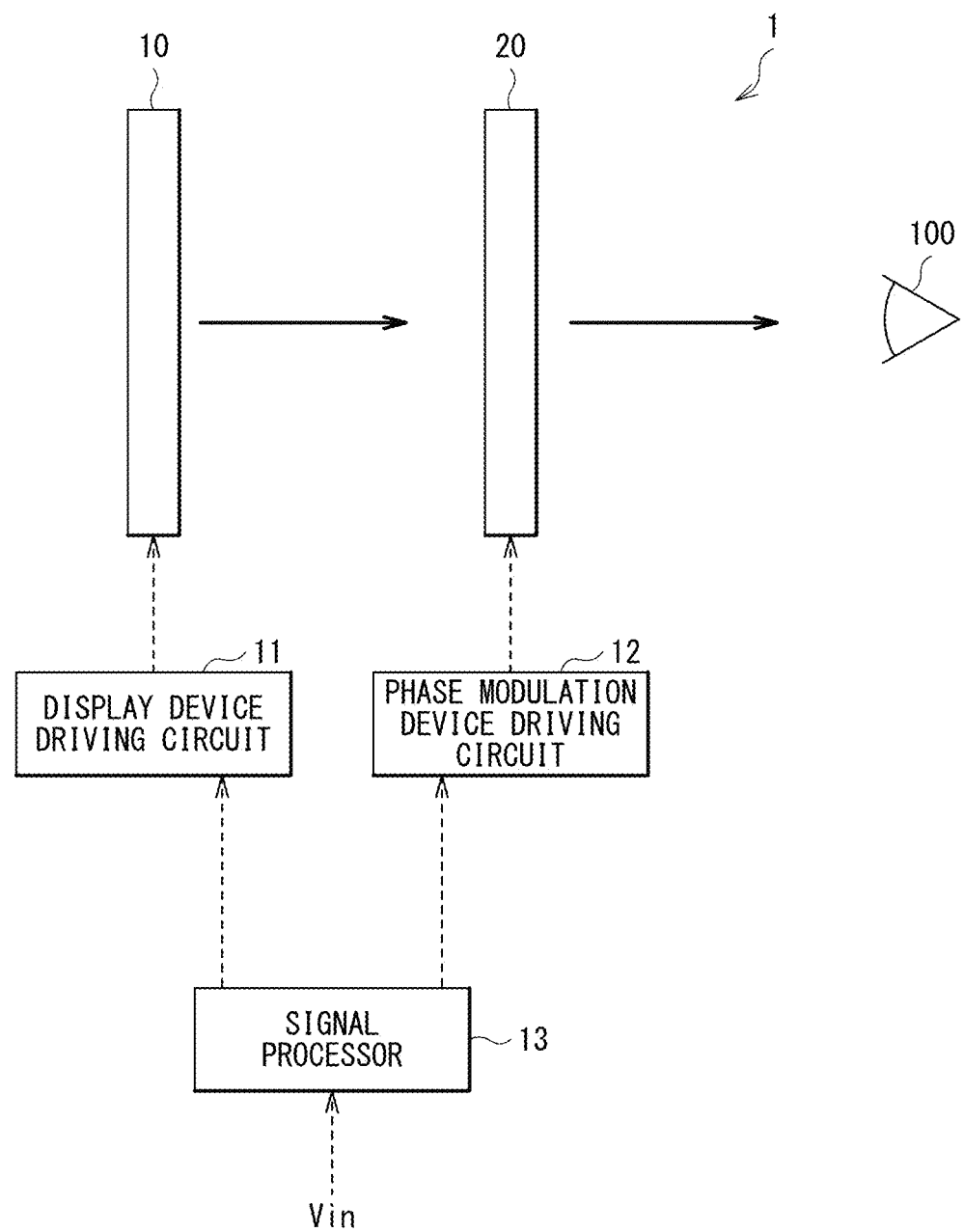

[FIG. 3]
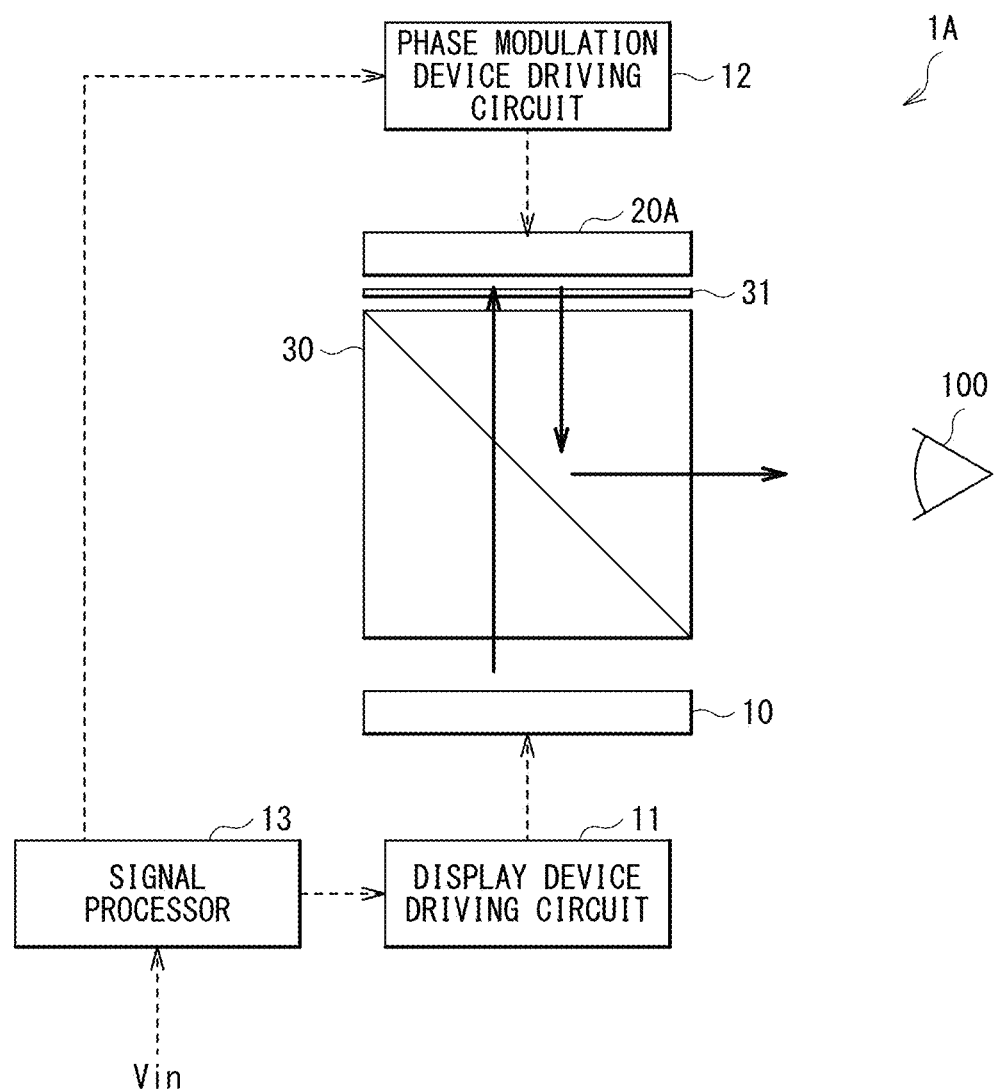

[FIG. 4]
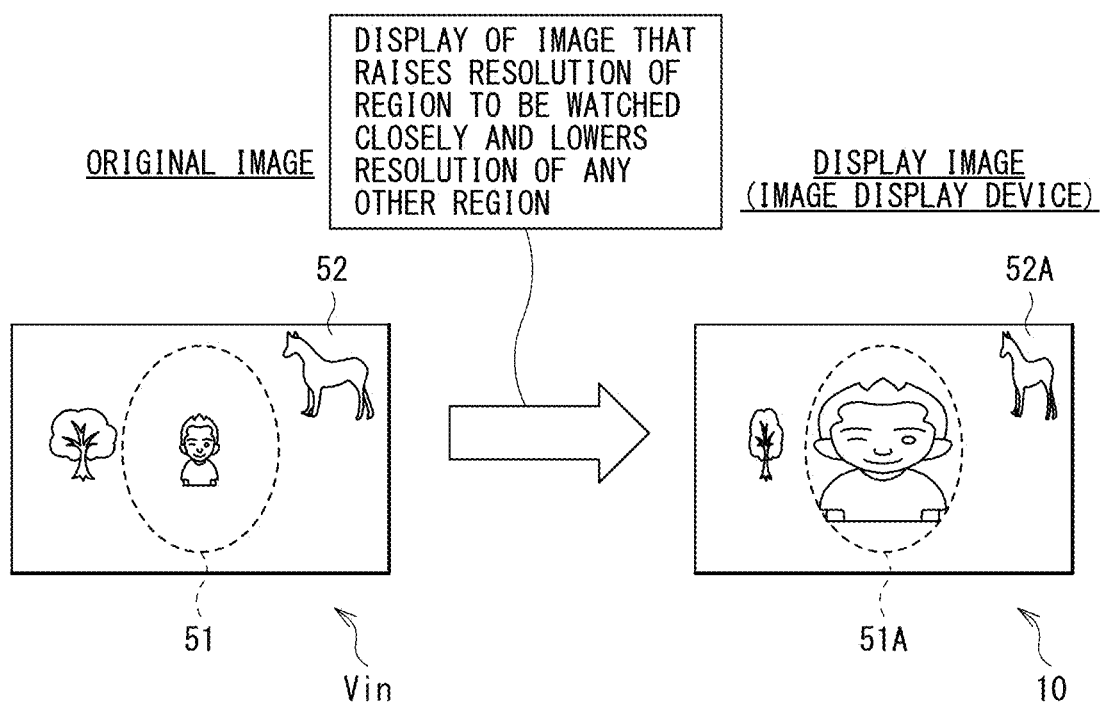

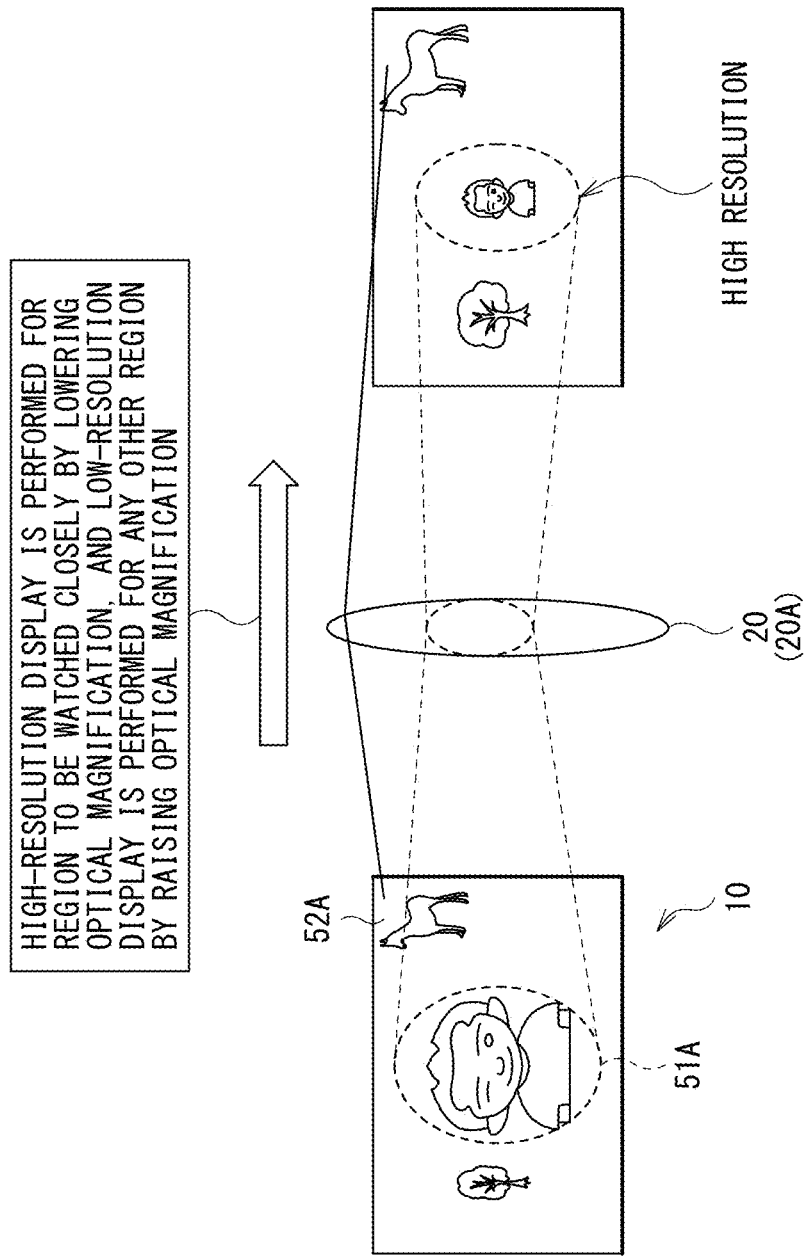

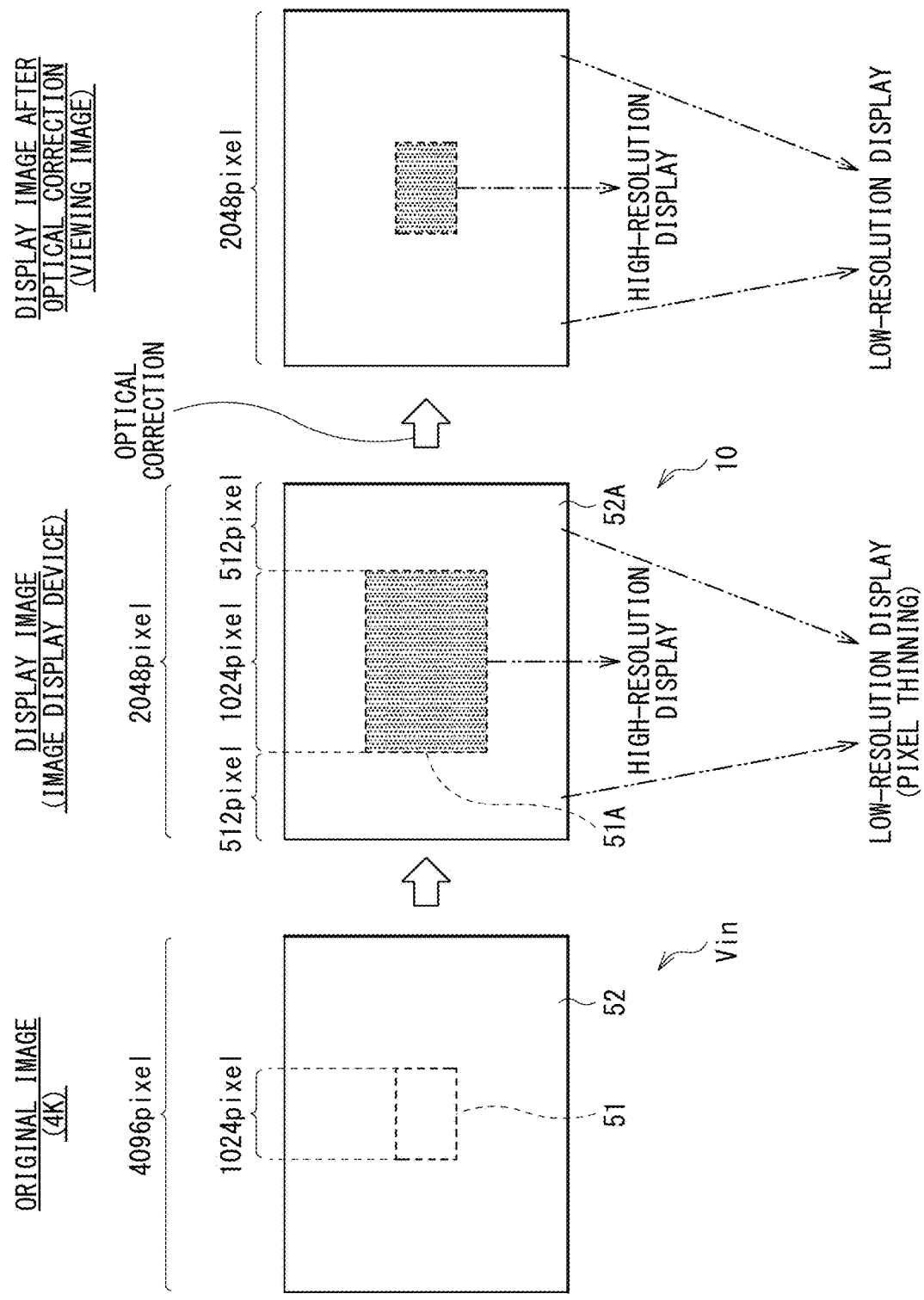

[FIG. 7]
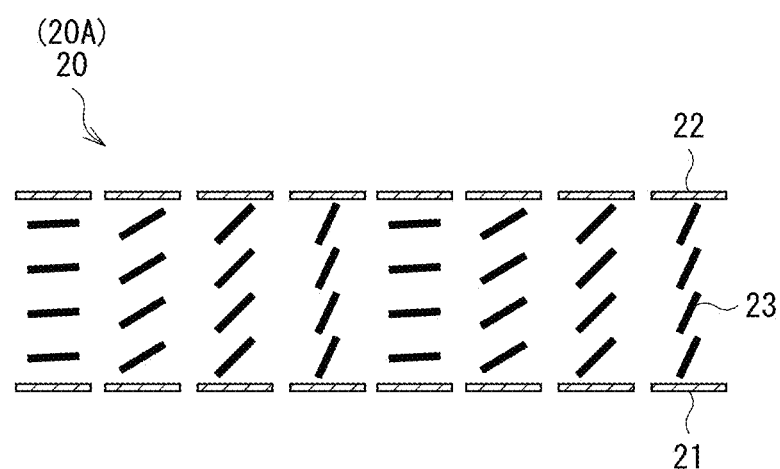
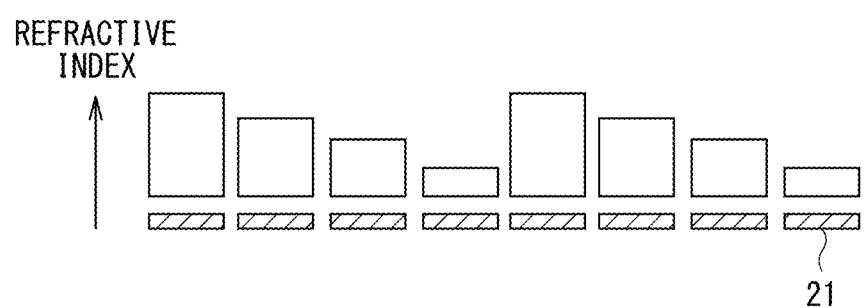

[FIG. 8]

| OPTICAL DEVICES | CONVEX LENS | CONCAVE LENS | LENS ARRAY | FRESNEL LENS | FREE-FORM SURFACE LENS |
|---|---|---|---|---|---|
| ◆ LENS<br>CHANGE OPTICAL PATH LENGTH BY CHANGING THICKNESS OF MATERIAL. | (convex shape) | (concave shape) | (four ellipses) | (sawtooth shape) | (free-form shape) |
| ◆ OPTICAL PHASE MODULATION DEVICE<br>CHANGE OPTICAL PATH LENGTH BY CHANGING REFRACTIVE INDEX.<br>REFRACTIVE INDEX LOW — HIGH | (gradient bar) | (gradient bar) | (gradient bar) | (striped bar) | (gradient bar) |

[FIG. 9]
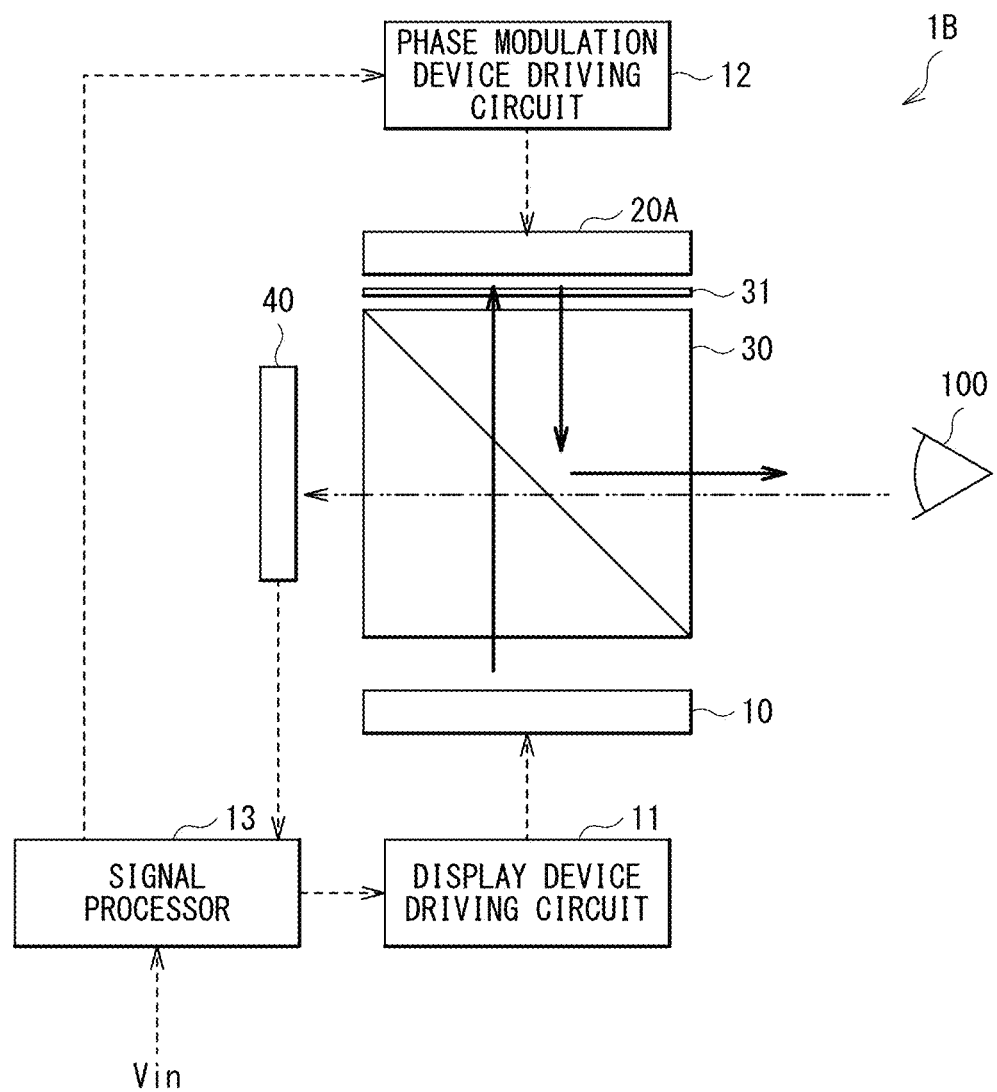

[FIG. 10]
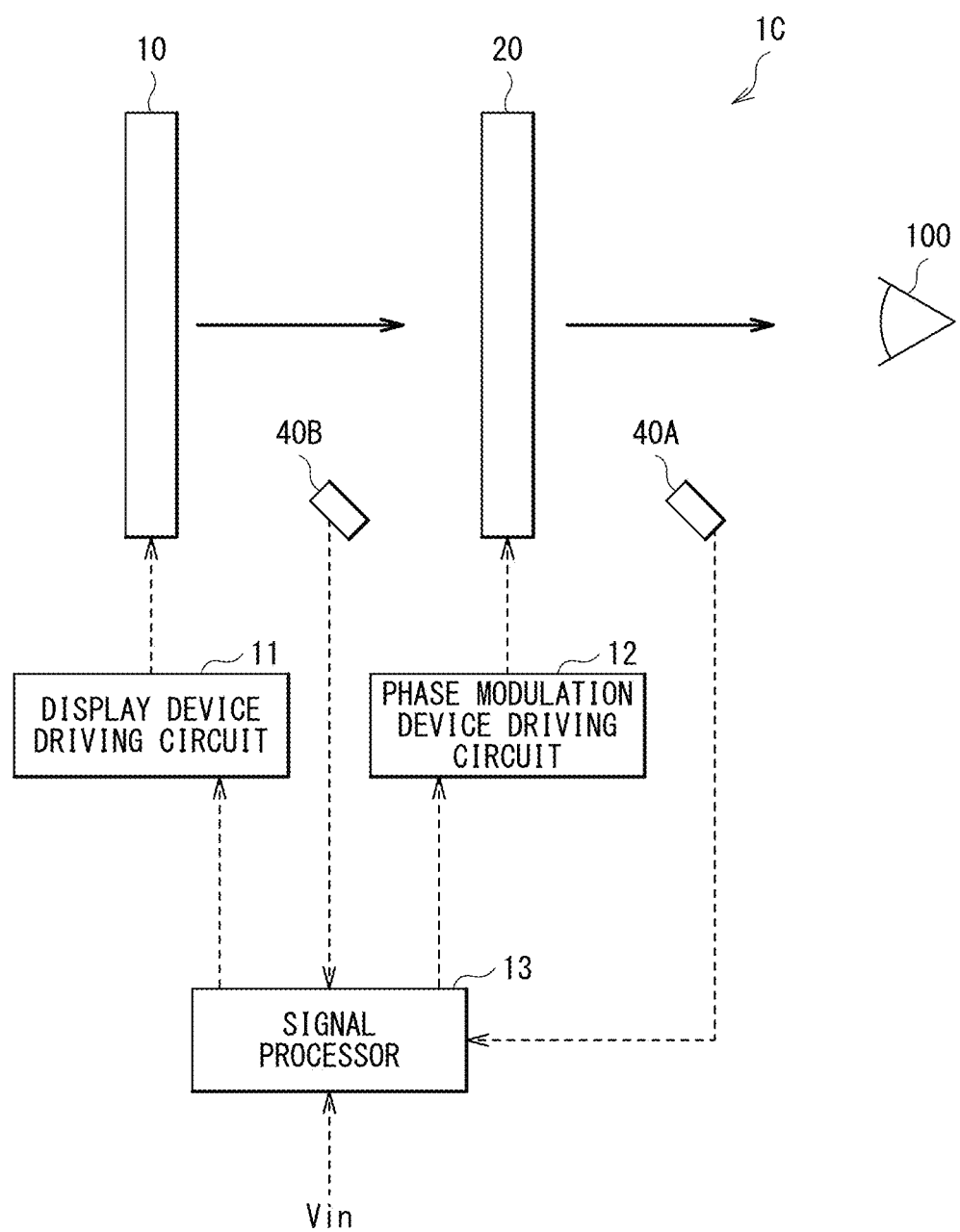

[FIG. 11]
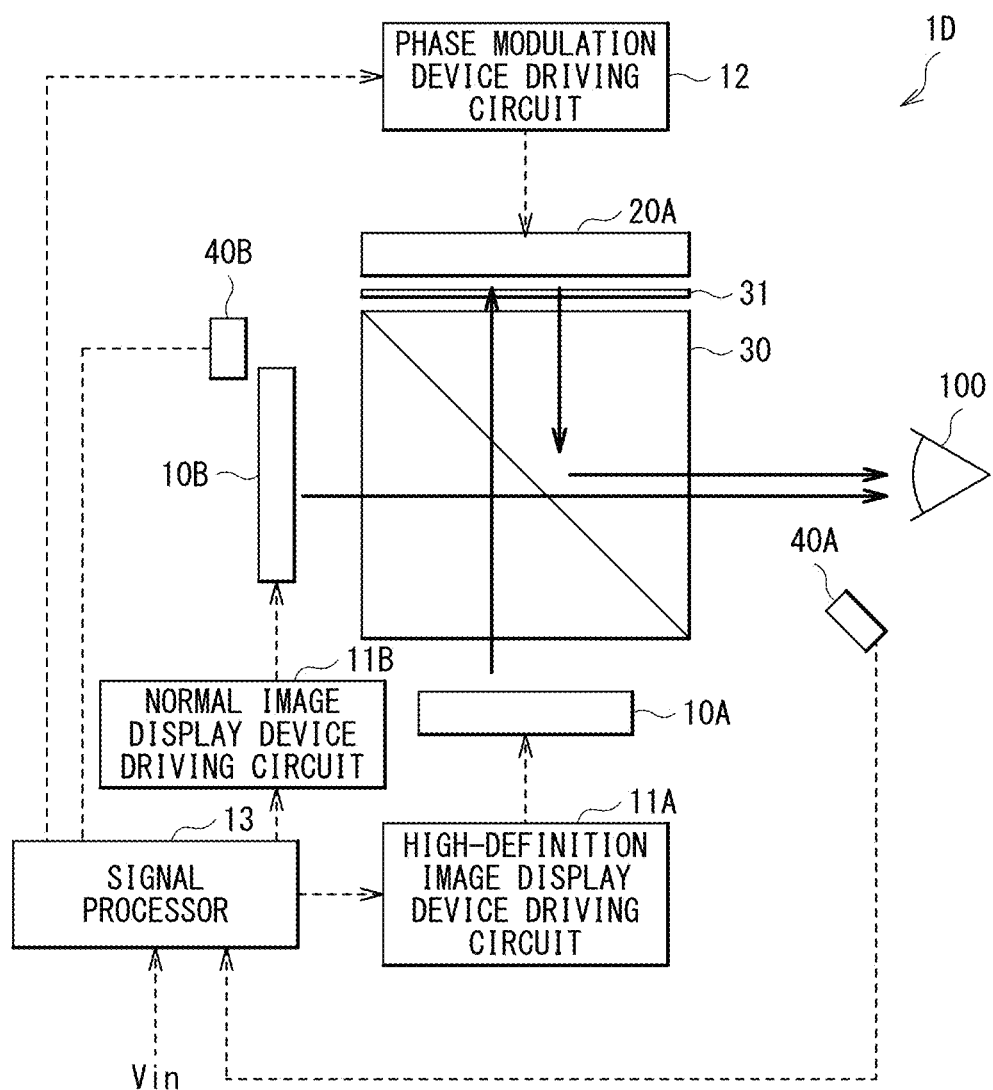

[FIG. 12]
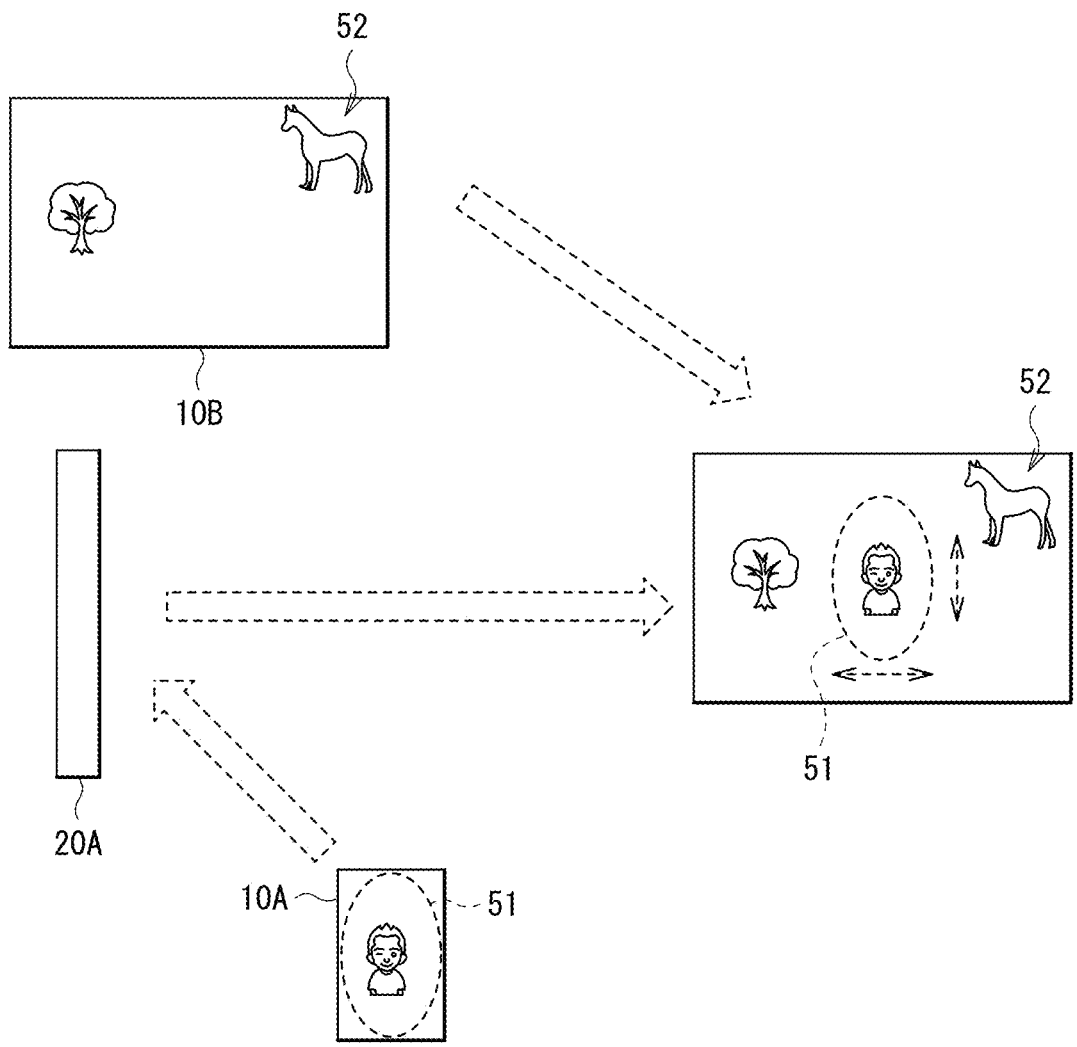

[FIG. 13]
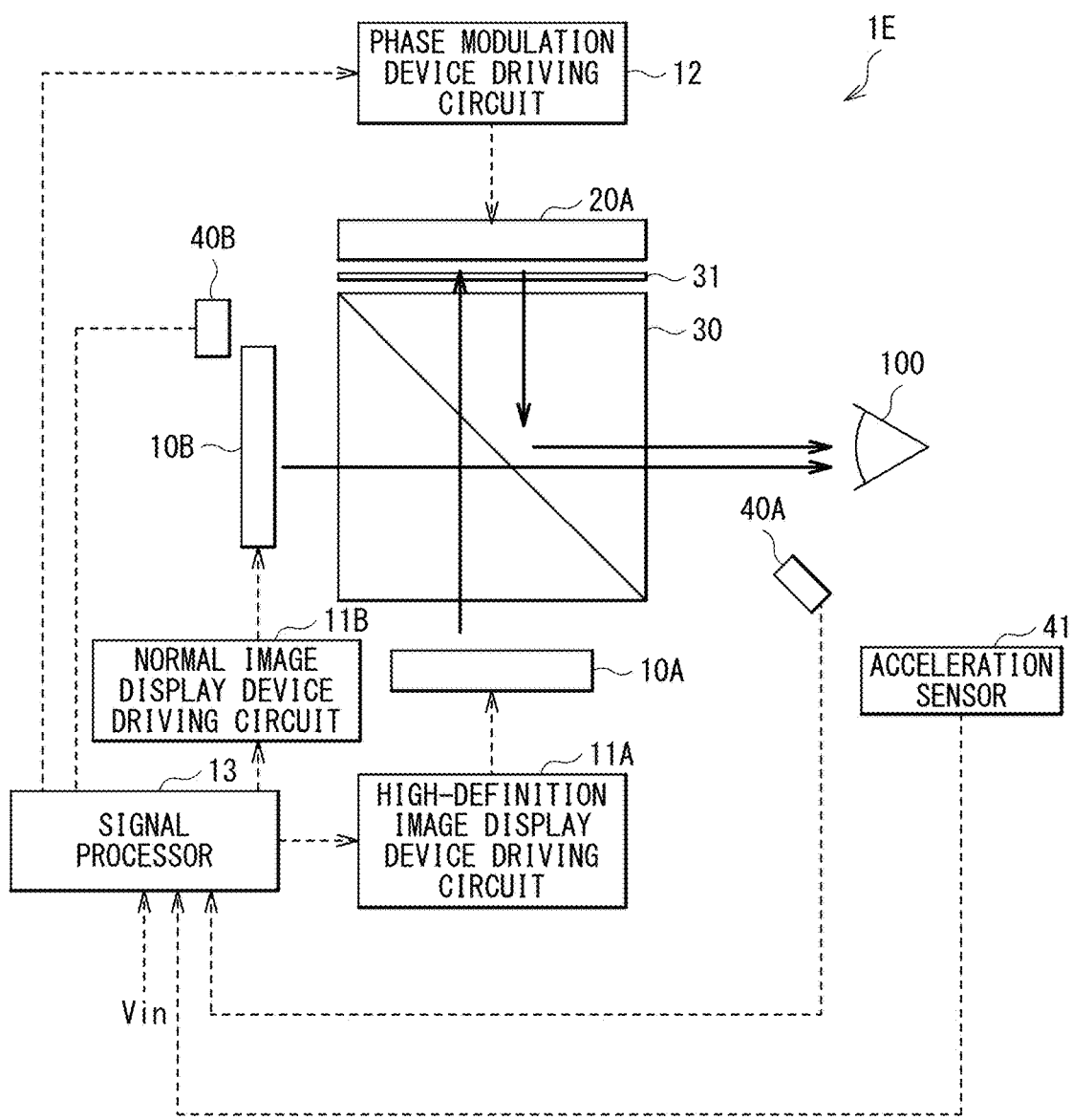

DISPLAY UNIT

CROSS REFERENCE TO RELATED APPLICATIONS

This application is a U.S. National Phase of International Patent Application No. PCT/JP2019/019075 filed on May 14, 2019, which claims priority benefit of Japanese Patent Application No. JP 2018-093716 filed in the Japan Patent Office on May 15, 2018. Each of the above-referenced applications is hereby incorporated herein by reference in its entirety.

TECHNICAL FIELD

The present disclosure relates to a display unit that performs image display with a resolution altered partially.

BACKGROUND ART

In a head-mounted display intended for VR (Virtual Reality), a technique has been developed that performs image display depending on a line-of-sight position of a viewer (for example, see PTL 1).

CITATION LIST

Patent Literature

PTL 1: US Patent Application Publication No. 2017/0262054 Specification

SUMMARY OF THE INVENTION

In a display such as, for example, the head-mounted display, it is desired to develop a technique that improves visibility by enhancing resolution partially only for a region to be watched closely by a viewer. In such a case, it is desired to develop a technique that alters the resolution in a manner of giving no feeling of strangeness to how an image is viewed as a whole.

It is therefore desirable to provide a display unit that makes it possible to perform display giving a reduced feeling of strangeness to how an image is viewed as a whole, while altering the resolution partially.

Means of Solving Problems

A display unit according to an embodiment of the present disclosure includes one or more display devices that perform image display by making a difference in resolution for each of a plurality of image regions in an original image, and an optical device that corrects optically for distortion of a display image that is caused by performing the image display at the different resolution for each of the plurality of image regions, a position of the image display between the plurality of image regions, or both.

In the display unit according to the embodiment of the present disclosure, the display device performs the image display by making the difference in resolution for each of the plurality of image regions in the original image. The optical device corrects optically for: the distortion of the display image that is caused by performing the image display at the different resolution for each of the plurality of image regions; the position of the image display between the plurality of image regions; or both.

BRIEF DESCRIPTION OF DRAWINGS

FIG. 1 is a configuration diagram illustrating an overview of a display unit according to a comparative example.

FIG. 2 is a configuration diagram schematically illustrating a first configuration example of a display unit according to a first embodiment of the present disclosure.

FIG. 3 is a configuration diagram schematically illustrating a second configuration example of the display unit according to the first embodiment.

FIG. 4 is an explanatory diagram illustrating an overview of image display onto an image display device in the display unit according to the first embodiment.

FIG. 5 is an explanatory diagram illustrating an overview of correction for distortion of a display image in the display unit according to the first embodiment.

FIG. 6 is an explanatory diagram illustrating a specific example of image display performed by the display unit according to the first embodiment.

FIG. 7 is an explanatory diagram illustrating a configuration example of an optical phase modulation device.

FIG. 8 is an explanatory diagram illustrating an example of application of the optical phase modulation device to various types of optical devices.

FIG. 9 is a configuration diagram schematically illustrating a first configuration example of a display unit according to a second embodiment.

FIG. 10 is a configuration diagram schematically illustrating a second configuration example of the display unit according to the second embodiment.

FIG. 11 is a configuration diagram schematically illustrating a configuration example of a display unit according to a third embodiment.

FIG. 12 is an explanatory diagram illustrating an overview of image display in the display unit according to the third embodiment.

FIG. 13 is a configuration diagram schematically illustrating a modification example of the display unit according to the third embodiment.

MODES FOR CARRYING OUT THE INVENTION

Hereinafter, some embodiments of the present disclosure are described in detail with reference to the drawings. It is to be noted that descriptions are given in the following order.

1. First Embodiment (a display unit that performs display by partially altering a resolution of an original image)
   1.0 Comparative Example (FIG. 1)
   1.1 Configuration and Operation of Display Unit According to First Embodiment (FIG. 2 to FIG. 8)
   1.2 Effects
2. Second Embodiment (a display unit that performs image display based on detection of a line of sight) (FIG. 9 and FIG. 10)
3. Third Embodiment (a display unit that includes two image display devices) (FIG. 11 to FIG. 13)
4. Other Embodiments

1. First Embodiment

1.0 Comparative Example

Overview and Problems of Display Unit According to Comparative Example

FIG. 1 illustrates an overview of a display unit 101 according to a comparative example.

The display unit 101 according to the comparative example includes a first display section 110, a second display section 120, a beam splitter 130, and an optical device 140.

Each of the first display section 110 and the second display section 120 includes, for example, an OLED (Organic Light-Emitting Diode) display.

The second display section 120 partially displays only an image region for which high-definition display is desired for an original image. The first display section 110 performs image display for a whole image region other than the image region for which the high-definition display is desired. The display unit 101 synthesizes a whole display image provided by the first display section 110 and a partial display image provided by the second display section 120 through the beam splitter 130 and the optical device 140, and outputs a resulting display image toward eyes 100 of a viewer. This allows the viewer to take a view of a partially high-definition image.

A viewer typically watches a middle region of an image closely, and therefore, for example, the image region for which the high-definition display is desired may be fixed to the middle region of the image; however, the display unit 101 makes it possible to change the image region for which the high-definition display is desired to any region by changing a placement angle of the beam splitter 130, for example. In such a case, it is also possible to detect a region to be watched closely by a viewer with use of a line-of-sight sensor, and to set such a region to be watched closely to the image region for which the high-definition display is desired.

In the display unit 101 according to the comparative example, it is possible to move the image region for which the high-definition display is desired by moving the beam splitter 130 in a mechanical manner, for example. Such a method has difficulty synthesizing the whole display image provided by the first display section 110 and the partial display image provided by the second display section 120 while keeping positional accuracy on each pixel basis. Further, it is preferable to have an eyesight adjustment function that makes display correction depending on an eyesight of a viewer; however, it is difficult to add the eyesight adjustment function.

1.1 Configuration and Operation of Display Unit According to First Embodiment (Overview of Display Unit)

FIG. 2 schematically illustrates a first configuration example of a display unit according to a first embodiment of the present disclosure. FIG. 3 schematically illustrates a second configuration example of the display unit according to the first embodiment of present disclosure.

The display unit according to the first embodiment is preferred for a head-mounted display, for example. However, the display unit according to the first embodiment is also applicable to any apparatus other than the head-mounted display.

The display unit according to the first embodiment includes an image display device 10, and an optical device (hereinafter referred to as a "correcting optical device") that corrects optically for distortion of a display image of the image display device 10. The display unit according to the first embodiment further includes a display device driving circuit 11, a phase modulation device driving circuit 12, and a signal processor 13.

An image signal Vin corresponding to an original image is inputted to the signal processor 13. The signal processor 13 performs image processing for the image signal Vin such that, in the image display device 10, the original image is displayed in a state in which the resolution differs for each of a plurality of image regions.

The image display device 10 includes, for example, a liquid crystal display or an OLED display. The display device driving circuit 11 drives the image display device 10, and causes the image display device 10 to display an image based on the image signal Vin after being subjected to signal processing by the signal processor 13.

The image display device 10 performs image display by making a difference in resolution for each of the plurality of image regions in the original image. For example, the plurality of image regions includes a first image region and a second image region. The image display device 10 performs the image display such that the first image region is higher in resolution than the second image region.

The correcting optical device includes a device having an optical action that allows for optically enlarging or reducing any region of a display image such as a free-form surface lens, for example, an optical phase modulation device. The optical phase modulation device includes an SLM (Spatial Light Modulator) such as a liquid crystal panel, for example. As illustrated in FIG. 7 and FIG. 8 to be described later, the optical phase modulation device makes it possible to change the optical action on each pixel basis by changing a phase distribution (a refractive index distribution) relative to light passing through the device.

The correcting optical device corrects optically for distortion of a display image in the image display device 10 that is caused by performing the image display at the different resolution for each of the plurality of image regions.

For example, a display unit 1 according to the first configuration example illustrated in FIG. 2 includes a transmissive phase modulation device 20 as the correcting optical device. The phase modulation device driving circuit 12 changes the phase distribution (the refractive index distribution) in the transmissive phase modulation device 20 such that distortion of the display image is corrected optically depending on a state of an image to be displayed in the image display device 10. In the display unit 1, the image display device 10 and the transmissive phase modulation device 20 are disposed on the same optical path. Light of the display image displayed in the image display device 10 transmits the transmissive phase modulation device 20. Through such an action, the distortion of the display image is corrected optically, and thereafter the light is outputted towards the eyes 100 of a viewer. This allows the viewer to take a view of a partially high-definition image.

Further, for example, a display unit 1A according to the second configuration example illustrated in FIG. 3 includes a reflective phase modulation device 20A as the correcting optical device. The display unit 1A according to the second configuration example further includes a polarizing beam splitter 30 and a λ/4 plate 31. The phase modulation device driving circuit 12 changes the phase distribution (the refractive index distribution) in the reflective phase modulation device 20A such that the distortion of the display image is corrected optically depending on a state of the image to be displayed in the image display device 10. In the display unit 1A, the image display device 10 and the reflective phase modulation device 20A are disposed oppositely on two different surfaces facing each other in the polarizing beam splitter 30. The λ/4 plate 31 is inserted between the reflective phase modulation device 20A and the polarizing beam splitter 30. The λ/4 plate 31 rotates a direction of polarized light such that reflected light from the reflective phase modulation device 20A acts as the polarized light that is reflected by the polarizing beam splitter 30. It is to be noted that a polarizing plate may be additionally inserted between the λ/4 plate 31 and the reflective phase modulation device 20A for improvement of an image characteristic, in particular, contrast. In the display unit 1A, the light of the display image displayed in the image display device 10 enters the reflective phase modulation device 20A through the polarizing beam splitter 30 and the λ/4 plate 31. The light of the display image is reflected by the reflective phase modulation device 20A, thereby correcting optically for the distortion of the display image. Thereafter, such light is outputted toward the eyes 100 of a viewer through the λ/4 plate 31 and the polarizing beam splitter 30. This allows the viewer to take a view of a partially high-definition image.

Specific Example of Display Operation

FIG. 4 illustrates an overview of image display onto the image display device 10 in any of the display units 1 and 1A. FIG. 5 illustrates an overview of correction for distortion of a display image in the image display device 10. FIG. 6 illustrates a specific example of image display performed by any of the display units 1 and 1A.

In the display units 1 and 1A, the image display is performed by making the difference in resolution for each of the plurality of image regions in the original image. Hereinafter, for ease of explanation, a case where the plurality of image regions is two image regions including the first image region and the second image region is described as an example. However, three or more image regions may be set and displayed by making a difference in resolution in three or more steps. Alternatively, a plurality of the first image regions may be provided (a plurality of regions for which a resolution is enhanced may be provided).

For example, as illustrated in FIG. 4, the image display device 10 performs image display such that a specific first image region 51 in the original image is higher in resolution than a second image region 52 other than the first image region 51. Here, as human visual characteristics, a phenomenon is known that an image is clearly visible only at a gaze point (a central axis of an eyeball, that is, a position of an object to be viewed with eyes turned on) and a narrow surrounding area thereof, and the image is visible in a blurred state in any other region (typically a region of +/−5 degrees relative to a line of sight). Typically, in many cases, a region to be watched closely by a viewer is a middle region of an image. Therefore, as illustrated in FIG. 4, for example, the first image region 51 is set to the middle region of the original image, and is displayed by enhancing a resolution relatively in the image display device 10. Further, for example, the second image region 52 is set to a surrounding region other than the middle region of the original image, and is displayed by lowering the resolution relatively in the image display device 10.

For example, as illustrated on the left side of FIG. 6, the original image is assumed to have a resolution of 4K (the number of pixels in a horizontal direction: 4096 pixels). It is assumed that the first image region 51 is, for example, the middle region (the number of pixels in the horizontal direction: 1024 pixels), and the second image region 52 is the surrounding region other than the middle region. Further, as illustrated in the middle of FIG. 6, an overall display resolution in the horizontal direction of the image display device 10 is assumed to be 2048 pixels. In this case, the signal processor 13 performs image processing in such a manner that, for example, the resolution of the first image region 51 remains in the resolution of the original image, and pixel thinning is performed for the second image region 52. The display device driving circuit 11 causes the image display device 10 to display an image based on the image signal Vin after being subjected to signal processing by the signal processor 13. As a result, a first image region 51A in the image display device 10 is displayed at higher resolution relatively, and a second image region 52A in the image display device 10 is displayed at lower resolution relatively.

In a case where the high-resolution display is partially performed in a method described above, display is performed in such a manner that an image ratio of the first image region 51A to the second image region 52A in the image display device 10 is different from an image ratio of the first image region 51 to the second image region 52 in the original image. The image ratio of the first image region 51A in the image display device 10 becomes greater than the image ratio of the first image region 51 in the original image. In contrast, the image ratio of the second image region 52A in the image display device 10 becomes smaller than the image ratio of the second image region 52 in the original image.

Therefore, as illustrated on the right sides of FIG. 5 and FIG. 6, distortion of a display image is corrected optically using the correcting optical device (the transmissive phase modulation device 20 or the reflective phase modulation device 20A). Specifically, the use of the correcting optical device makes correction to optically reduce an image of the first image region 51A in the image display device 10 (to lower optical magnification), and to optically enlarge an image of the second image region 52A (to raise the optical magnification). This allows a viewing image (a display image after optical correction) in the eyes 100 of a viewer to exhibit high resolution in a region to be watched closely, and gives a reduced feeling of strangeness to how the image is viewed as a whole.

It is to be noted that, in a case where the correcting optical device is configured by the optical phase modulation device, it is possible to change a lens characteristic such as a focal distance into any state. This allows the correcting optical device to perform not only optical correction for the distortion of the display image, but also optical correction depending on an eyesight of a viewer. Therefore, an eyesight adjustment function may be added.

Further, in the specific example described above, the middle region of the original image is set to a region (the first image region 51) where the resolution is to be enhanced; however, the region where the resolution is to be enhanced may be any region other than the middle region of the original image.

Specific Example of Optical Phase Modulation Device

Description is provided of a specific example of the optical phase modulation device (the transmissive phase modulation device 20 or the reflective phase modulation device 20A) that serves as the correcting optical device. FIG. 7 illustrates a configuration example of the optical phase modulation device.

FIG. 7 illustrates an example where the optical phase modulation device includes a phase modulation liquid crystal panel. The optical phase modulation device is configured by, for example, a first glass substrate and a second glass substrate that are disposed to be opposed to each other. A liquid crystal layer including liquid crystal molecules 23 is sealed between the first glass substrate and the second glass substrate by unillustrated sealing members.

A counter electrode (a common electrode) 22 is provided on the first glass substrate. A plurality of pixel electrodes 21 is provided on the second glass substrate.

In a case where the optical phase modulation device is the transmissive phase modulation device 20, both of the counter electrode 22 and the pixel electrode 21 are configured by transparent electrodes that transmit light. In a case where the optical phase modulation device is the reflective phase modulation device 20A, the counter electrode 22 is configured by the transparent electrode that transmits light, and the pixel electrode 21 is configured by a reflective electrode that reflects light.

A common voltage is applied to the counter electrode 22. An applied voltage depending on an input signal is applied to the plurality of pixel electrodes 21. A tilt of the liquid crystal molecules 23 in the optical phase modulation device varies with the applied voltage. Depending on variations in the tilt of the liquid crystal molecules 23, the phase distribution (the refractive index distribution) relative to light passing through the device varies, as illustrated at the lower side of FIG. 7. This makes it possible to change an optical action on each pixel basis. It is to be noted that a material for performing optical phase modulation is not limited to a liquid crystal, but an electro-optic crystal or the like may be also used.

FIG. 8 illustrates an example of application of the optical phase modulation device to various types of optical devices.

As illustrated in FIG. 8, various types of lenses such as a convex lens, a concave lens, a lens array, a Fresnel lens, and a free-form surface lens are known as the various types of optical devices. In these lenses, an optical path length is changed by changing a thickness of a lens material. The optical phase modulation device makes it possible to change the optical path length by changing the refractive index distribution in the device. This allows for achieving optical characteristics equivalent to those of the various types of lenses.

1.2 Effects

As described above, according to the display units 1 and 1A of the first embodiment, the image display is performed by making a difference in resolution for each of the plurality of image regions, and distortion of a display image that is caused by such image display is corrected optically with use of the correcting optical device, which makes it possible to perform display giving a reduced feeling of strangeness to how the image is viewed as a whole, while altering the resolution partially.

Further, according to the display units 1 and 1A of the first embodiment, it is possible to perform high-resolution display partially for any image region. In addition, it is possible to add the eyesight adjustment function by the use of the correcting optical device. Moreover, even in a case where an overall resolution of the image display device 10 is a lower resolution relative to the original image, it is possible to perform partially high-resolution display. This makes it possible to enhance the resolution relatively in, for example, a region to be watched closely while taking advantage of the performance of the image display device 10.

It is to be noted that the effects described in the present specification are merely exemplified and non-limiting, and effects of the present disclosure may be other effects, or may further include any other effects. The same is true for effects of other subsequent embodiments.

2. Second Embodiment

Next, description is provided of a display unit according to a second embodiment of the present disclosure. It is to be noted that, hereinafter, any component parts substantially same as those in the display unit according to the above-described first embodiment are denoted with the same reference numerals, and the related descriptions are omitted as appropriate.

FIG. 9 schematically illustrates a first configuration example of the display unit according to the second embodiment of the present disclosure.

A display unit 1B illustrated in FIG. 9 further includes a line-of-sight detector 40 relative to a configuration of the display unit 1A illustrated in FIG. 3. The line-of-sight detector 40 detects a region to be watched closely by a viewer by detecting a line-of-sight position of the viewer through the polarizing beam splitter 30.

The line-of-sight detector 40 may adopt, for example, an infrared light detection method using an infrared sensor or a visible light detection method using a visible light image sensor.

The line-of-sight detector 40 outputs a detection result to the signal processor 13. The signal processor 13 may set a region to be watched closely to the above-described first image region 51 and a region other than the region to be watched closely to the second image region 52 on the basis of the detection result of the line-of-sight detector 40, and may perform image processing for the image signal Vin such that, in the image display device 10, relatively higher-resolution display is performed for the region to be watched closely, and relatively lower-resolution display is performed for the region other than the region to be watched closely.

It is to be noted that a function allowing a viewer to optionally specify a region to be displayed at high resolution may be added. In such a case, a configuration may be adopted that makes it possible to select whether the region to be displayed at high resolution is determined on the basis of a detection result of the line-of-sight detector 40, or is specified by the viewer in person.

As described above, according to the display unit 1B of the second embodiment, partially high-resolution display is performed on the basis of the detection result from the line-of-sight detector 40, which makes it possible to perform the high-resolution display for a region to be watched closely on a steady basis by eye tracking even in a case where a line-of-sight position of a viewer varies.

It is to be noted that, also in the display unit 1 (FIG. 2) that uses the transmissive phase modulation device 20 as the correcting optical device, it is possible to adopt a configuration that includes the line-of-sight detector 40 in a similar manner.

FIG. 10 schematically illustrates a second configuration example of the display unit according to the second embodiment of the present disclosure.

A display unit 1C illustrated in FIG. 10 further includes line-of-sight detectors 40A and 40B relative to a configuration of the display unit 1 illustrated in FIG. 2. The line-of-sight detector 40A is disposed between the transmissive phase modulation device 20 and the eyes 100. The line-of-sight detector 40B is disposed between the image display device 10 and the transmissive phase modulation device 20.

As with the line-of-sight detector 40 of the display unit 1B illustrated in FIG. 9, the line-of-sight detectors 40A and 40B detect a region to be watched closely by a viewer by detecting a line-of-sight position of the viewer. The line-of-sight detectors 40A and 40B may adopt, for example, the infrared light detection method using the infrared sensor or the visible light detection method using the visible light image sensor.

Each of the line-of-sight detectors 40A and 40B outputs a detection result to the signal processor 13. The signal processor 13 may set a region to be watched closely to the above-described first image region 51 and a region other than the region to be watched closely to the second image region 52 on the basis of the detection results of the line-of-sight detectors 40A and 40B, and may perform image processing for the image signal Vin such that, in the image display device 10, relatively higher-resolution display is performed for the region to be watched closely, and relatively lower-resolution display is performed for the region other than the region to be watched closely.

It is to be noted that only any one of the line-of-sight detectors 40A and 40B may be disposed, and the line-of-sight position of the viewer may be detected by only any one of such line-of-sight detectors 40A and 40B.

Any other configurations, operation, and effects may be substantially similar to those of the display units 1 and 1A according to the above-described first embodiment.

3. Third Embodiment

Next, description is provided of a display unit according to a third embodiment of the present disclosure. It is to be noted that, hereinafter, any component parts substantially same as those in the display unit according to the above-described first or second embodiment are denoted with the same reference numerals, and the related descriptions are omitted as appropriate.

FIG. 11 schematically illustrates a first configuration example of the display unit according to the third embodiment of the present disclosure. FIG. 12 illustrates an overview of image display in a display unit 1D according to the third embodiment.

The display unit 1D illustrated in FIG. 11 includes a high-definition image display device 10A and a normal image display device 10B in place of the image display device 10 relative to a configuration of the display unit 1A illustrated in FIG. 3. Further, the display unit 1D illustrated in FIG. 11 includes a high-definition image display device driving circuit 11A and a normal image display device driving circuit 11B in place of the display device driving circuit 11 relative to the configuration of the display unit 1A illustrated in FIG. 3.

The high-definition image display device 10A corresponds to a specific example of a "first display device" in a technique of the present disclosure. The normal image display device 10B corresponds to a specific example of a "second display device" in a technique of the present disclosure.

The high-definition image display device driving circuit 11A drives the high-definition image display device 10A, and causes the image display device 10 to display an image based on the image signal Vin after being subjected to signal processing by the signal processor 13.

The normal image display device driving circuit 11B drives the normal image display device 10B, and causes the image display device 10 to display the image based on the image signal Vin after being subjected to signal processing by the signal processor 13.

The high-definition image display device 10A and the reflective phase modulation device 20A are disposed oppositely on two different surface sides facing each other in the polarizing beam splitter 30.

The normal image display device 10B is disposed on a surface side facing the eyes 100 in the polarizing beam splitter 30.

As illustrated in FIG. 12, the high-definition image display device 10A performs relatively higher-resolution image display. The normal image display device 10B performs relatively lower-resolution (normal-resolution) image display.

The polarizing beam splitter 30 corresponds to a specific example of a "synthetic device" in a technique of the present disclosure. The polarizing beam splitter 30 synthesizes a display image provided by the high-definition image display device 10A and a display image provided by the normal image display device 10B. The polarizing beam splitter 30 synthesizes images such that the display image provided by the high-definition image display device 10A is displayed in a region corresponding to the above-described first image region 51 (a region to be watched closely), and the display image provided by the normal image display device 10B is displayed in a region corresponding to the above-described second image region 52 (a region other than the region to be watched closely).

The reflective phase modulation device 20A corrects optically for a position of the image display between two image regions including the region corresponding to the first image region 51 and the region corresponding to the second image region 52.

Here, the display unit 1B illustrated in FIG. 11 further includes line-of-sight detectors 40A and 40B relative to a configuration of the display unit 1A illustrated in FIG. 3. The line-of-sight detector 40A is disposed between the polarizing beam splitter 30 and the eyes 100. The line-of-sight detector 40B is disposed on a surface side of the polarizing beam splitter 30 in which the normal image display device 10B is disposed.

The line-of-sight detectors 40A and 40B detect a region to be watched closely by a viewer by detecting a line-of-sight position of the viewer. The line-of-sight detectors 40A and 40B may adopt, for example, the infrared light detection method using the infrared sensor or the visible light detection method using the visible light image sensor.

It is to be noted that only any one of the line-of-sight detectors 40A and 40B may be disposed, and the line-of-sight position of the viewer may be detected by only any one of such line-of-sight detectors 40A and 40B.

Each of the line-of-sight detectors 40A and 40B outputs a detection result to the signal processor 13. On the basis of the detection results of the line-of-sight detectors 40A and 40B, the signal processor 13 controls an optical characteristic of the reflective phase modulation device 20A through the phase modulation device driving circuit 12 such that a display position of the display image provided by the high-definition image display device 10A is corrected optically relative to a display position of the display image provided by the normal image display device 10B (such that the display position of the display image of the high-definition image display device 10A becomes a position corresponding to a region to be watched closely). As a result, as for display of an image derived after synthesis performed by the polarizing beam splitter 30, the region to be watched closely is displayed at relatively higher-resolution, and a region other than the region to be watched closely is displayed at relatively lower-resolution.

FIG. 13 is a configuration diagram schematically illustrating a modification example of the display unit according to the third embodiment.

A display unit 1E illustrated in FIG. 13 further includes an acceleration sensor 41 relative to a configuration of the display unit 1D illustrated in FIG. 11. The acceleration sensor 41 detects head motion of a viewer in a case where the display unit 1D is configured as a head-mounted display, for example.

The signal processor 13 calculates, for example, a direction or a distance of head motion of a viewer on the basis of a detection result of the acceleration sensor 41. On the basis of the detection results of a line-of-sight position from the line-of-sight detectors 40A and 40B, and the detection result of the head motion of the viewer from the acceleration sensor 41, the signal processor 13 controls an optical characteristic of the reflective phase modulation device 20A through the phase modulation device driving circuit 12 such that a display position of a display image of the high-definition image display device 10A is corrected optically. The reflective phase modulation device 20A corrects optically for the display position of the display image of the high-definition image display device 10A such that, for example, the display position of the display image provided by the high-definition image display device 10A moves toward a direction in which the head of the viewer moves. This makes it possible to match motion of an image and motion of the viewer, which allows for suppression of so-called "VR sickness".

According to the display unit of the above third embodiment, the display position of the display image provided by the high-definition image display device 10A is corrected optically using the reflective phase modulation device 20A, which eliminates a movable part to correct for the display position, thereby allowing for improvement of the reliability. For example, in the display unit 101 according to the comparative example illustrated in FIG. 1, a position of an image region for which high-definition display is desired is altered by moving the beam splitter 130 in a mechanical manner. Therefore, the movable part is present, resulting in deterioration in the reliability. Further, in such a case, an amount of movement of an image with use of the beam splitter 130 is different in the vicinity of a movable point of support of the beam splitter 130 and in a location away from the movable point of support of the beam splitter 130, which makes it difficult to correct for the display position with a high degree of accuracy. In contrast, according to the display unit of the third embodiment, it is possible to correct for the display position with a high degree of accuracy.

It is to be noted that, in the above description of the third embodiment, a case of performing correction for the display position of the display image provided by the high-definition image display device 10A is described as an example; however, not only the display position, but also distortion of the display image provided by the high-definition image display device 10A may be corrected using the reflective phase modulation device 20A.

Any other configurations, operation, and effects may be substantially similar to those of the display unit according to the above-described first embodiment or second embodiment.

4. Other Embodiments

A technique of the present disclosure is not limited to the descriptions of the above respective embodiments, but various modifications may be made.

For example, the present technology may be configured as follows.

According to the present technology that is configured as follows, the image display is performed by making the difference in resolution for each of the plurality of image regions, and the distortion of the display image that is caused by performing such image display, the position of the image display between the plurality of image regions, or both are corrected optically with use of the optical device. Hence, it is possible to perform display giving a reduced feeling of strangeness to how the image is viewed as a whole, while altering the resolution partially.

(1)

A display unit including:

one or more display devices that perform image display by making a difference in resolution for each of a plurality of image regions in an original image; and an optical device that corrects optically for distortion of a display image that is caused by performing the image display at the different resolution for each of the plurality of image regions, a position of the image display between the plurality of image regions, or both.

(2)

The display unit according to (1), further including a signal processor that performs image processing for the original image to cause the original image to be displayed in a state in which the resolution differs for each of the plurality of image regions in the one or more display devices.

(3)

The display unit according to (1) or (2), in which the plurality of image regions includes one or more first image regions and a second image region, and the one or more display devices perform the image display to cause the first image region to be higher in the resolution than the second image region.

(4)

The display unit according to (3), in which the first image region includes a middle region of an image, and the second image region includes a surrounding region other than the middle region.

(5)

The display unit according to (3), in which the first image region includes a gazing region to be watched closely by a viewer, and the second image region includes a region other than the gazing region.

(6)

The display unit according to (5), further including a detector that detects the gazing region.

(7)

The display unit according to (6), in which the detector includes an infrared sensor.

(8)

The display unit according to (6), in which the detector includes an image sensor.

(9)

The display unit according to any one of (1) to (8), in which the optical device includes a transmissive phase modulation device.

(10)

The display unit according to any one of (1) to (8), in which the optical device includes a reflective phase modulation device.

(11)

The display unit according to any one of (1) to (8), further including a synthetic device, in which the one or more display devices include a first display device that performs relatively higher-resolution image display and a second display device that performs relatively lower-resolution image display, and the synthetic device synthesizes a display image provided by the first display device and a display image provided by the second display device.

(12)

The display unit according to (11), in which the optical device includes a phase modulation device, and corrects optically for a display position of a display image of the first display device relative to a display position of a display image provided by the second display device, on a basis of a line-of-sight position of a viewer.

(13)

The display unit according to (11) or (12), in which the optical device includes a phase modulation device, and corrects optically for a display position of a display image of the first display device relative to a display position of a display image provided by the second display device, on a basis of head motion of a viewer.

This application claims priority from Japanese Patent Application No. 2018-093716 filed with the Japan Patent Office on May 15, 2018, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display unit, comprising:
    at least one display device configured to:
        create a difference in resolution for each of a plurality of image regions in an original image; and
        perform image display based on the difference in the resolution for each of the plurality of image regions in the original image, wherein the at least one display device includes a first display device configured to perform a higher-resolution image display and a second display device configured to perform a lower-resolution image display; and
    an optical device configured to:
        optically correct distortion of a display image obtained based on the image display; and
        optically correct a first display position of a first display image of the first display device relative to a second display position of a second display image of the second display device, wherein the first display image is optically corrected based on a line-of-sight position of a viewer.

2. The display unit according to claim 1, further comprising a signal processor configured to perform image processing on the original image to cause the original image to be displayed in a state in which the resolution differs for each of the plurality of image regions in the at least one display device.

3. The display unit according to claim 1, wherein
    the plurality of image regions comprises at least one first image region and at least one second image region, and
    the at least one display device is configured to perform the image display to cause the at least one first image region to be higher in the resolution than the at least one second image region.

4. The display unit according to claim 3, wherein the at least one first image region includes a middle region of the original image, and the at least one second image region includes a surrounding region different from the middle region.

5. The display unit according to claim 3, wherein the at least one first image region includes a gazing region to be watched closely by the viewer, and the at least one second image region includes a region different from the gazing region.

6. The display unit according to claim 5, further comprising a detector configured to detect the gazing region.

7. The display unit according to claim 6, wherein the detector comprises an infrared sensor.

8. The display unit according to claim 6, wherein the detector comprises an image sensor.

9. The display unit according to claim 1, wherein the optical device comprises a transmissive phase modulation device.

10. The display unit according to claim 1, wherein the optical device comprises a reflective phase modulation device.

11. The display unit according to claim 1, further comprising a synthetic device configured to synthesize the first display image and the second display image.

12. The display unit according to claim 1, wherein the optical device is further configured to optically correct the first display position based on a head motion of the viewer.

* * * * *